United States Patent [19]

Higbee

[11] 3,918,499
[45] Nov. 11, 1975

[54] HOSE
[75] Inventor: Charles D. Higbee, Arvada, Colo.
[73] Assignee: The Gates Rubber Company, Denver, Colo.
[22] Filed: Feb. 23, 1973
[21] Appl. No.: 335,182

Related U.S. Application Data
[62] Division of Ser. No. 109,321, Jan. 25, 1971, Pat. No. 3,755,032.

[52] U.S. Cl. .............................................. 138/125
[51] Int. Cl.² ........................................ F16L 11/08
[58] Field of Search ............................ 138/125, 126

[56] References Cited
UNITED STATES PATENTS

| | | | |
|---|---|---|---|
| 2,652,093 | 9/1953 | Burton | 138/126 |
| 3,062,241 | 11/1962 | Brumbach | 138/125 |
| 3,245,431 | 4/1966 | Coe | 138/135 |
| 3,383,258 | 5/1968 | Houlston | 138/125 X |
| 3,463,197 | 8/1969 | Slade | 138/125 |
| 3,605,818 | 9/1971 | Balchan | 138/126 |

Primary Examiner—Herbert Goldstein
Attorney, Agent, or Firm—H. W. Oberg, Jr.; Curtis H. Castleman, Jr.; Raymond Fink

[57] ABSTRACT

A heat setting polymeric hose having a high pack, textile reinforcement that shrinks at a temperature at least equal to the heat setting temperature of the polymeric. The hose is made by twining a heat shrinkable and generally untwisted textile reinforcement around a heat curable polymeric tube; applying an adhesive and heat setting polymeric cover over the reinforcement; and heat setting or curing the polymeric while simultaneously shrinking the reinforcement to a predetermined position within the hose.

1 Claim, 3 Drawing Figures

HOSE

This is a division of application Ser. No. 109,321, filed on Jan. 25, 1971, now U.S. Pat. No. 3,755,032.

BACKGROUND OF THE INVENTION

The invention relates to pipes and tubular conduits, but more particularly, the invention relates to flexible polymeric hose having a high pack textile reinforcement.

Prior art discloses many types of flexible hoses that are reinforced with a textile yarn. The prior art teaches the use of heat shrinkable textile reinforcement for flexible hose where the shrink temperature of the textile is not reached during the manufacturing process once the textile has been twined into position. For example, a hose having a nylon tube, a nylon textile reinforcement and a nylon cover, would fall into this catagory. However, the art does not teach twining an untreated heat shrinkable textile reinforcement in a heat setting polymeric hose where sufficient heat is generated during the heat setting cycle to shrink the reinforcement. As greater hose working pressures are encountered, the amount of textile reinforcement may be increased or a greater strength reinforcement may be used to give the hose more pressure capability. The amount of reinforcement may be increased by either adding successive reinforcement plies or by increasing the amount of reinforcement in a single ply. A hose is said to have a 100 percent coverage or "full pack" reinforcement when the tube of the hose is completely covered with one or more plies of reinforcement. It is economically advantageous to put as much reinforcement as possible in the first reinforcement ply as the strength efficiency of each successive ply is greatly reduced because of its location at a larger diameter. Theoretically, a 100 percent reinforcement coverage could be achieved in a single twining ply if the interstitial spaces between the individual strands of the twined reinforcement were filled.

The amount of reinforcement which may be twined into a single ply is influenced by the physical properties of the textile being used. For example, polyester yarn that is treated for rubber adhesion and pre-shrunk has a high degree of self-friction that affects twining. Consequently, treated polyester yarn cannot be pulled into a high percentage of coverage by braiding because high friction between individual strands of yarn prevents the strands from being pulled into a tight relationship. Heretofore, it was typical to treat yarns for adhesion prior to including the yarn as a reinforcement in a flexible hose. Treating the yarn for adhesion increased the friction thereof. This had the effect of limiting the amount of reinforcement which could be braided in a single ply to a coverage value that approached 85 percent. Also, the yarn was pre-shrunk where the shrink temperature of the yarn was at least equal to the cure temperature for the polymeric hose material. Pre-shrinking the yarn was necessary to prevent uncontrolled yarn shrinkage during the polymeric heat setting cycle that caused hose distortion.

SUMMARY OF THE INVENTION

It has been found that a flexible and collapse resistant polymeric hose of superior construction and quality results when a textile reinforcement coverage of 85 to 100 percent is provided in the first reinforcement ply of the hose. The high percentage of coverage imparts collapse resistance to the hose. The "high pack" is obtained through the method of the invention where a heat shrinkable textile yarn such as nylon or polyester is used as a reinforcement in a heat setting polymeric hose. The hose is fabricated by twining such as braiding or spiraling a heat shrinkable and generally untwisted yarn over a heat setting tube of a polymeric material. The tube may optionally have a mandrel disposed therein during the manufacturing process. An adhesive and heat setting polymeric cover are respectively applied over the reinforcement to define an unset or "green" hose. The hose is then set with heat which simultaneously causes the reinforcement to shrink to a higher density coverage and to a predetermined helical angle.

Accordingly, it is an object of the invention to provide a flexible and collapse resistant polymeric hose having a textile reinforcement pack from 85 to 100 percent in the first ply.

These and other objects or advantages of the invention will become more apparent upon review of the drawings and description thereof wherein.

DESCRIPTION OF PREFERRED EMBODIMENT

Figure 1:
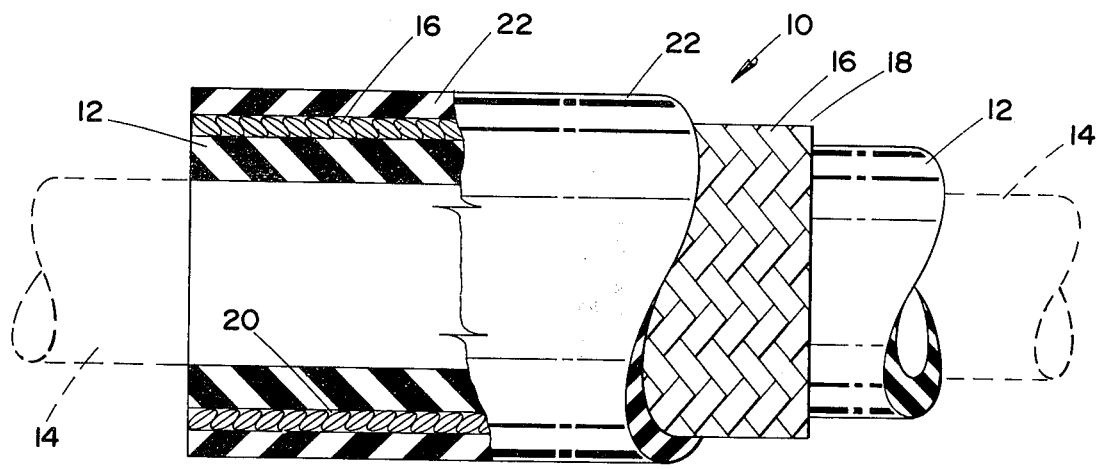
FIG. 1 is a view partially in section and partially in cutaway showing a hose of the invention during a step of manufacture.

Referring to FIG. 1, the hose 10 of the invention is begun by forming a heat setting tube 12 of polymeric material. Examples of heat setting polymeric materials include natural and synthetic rubbers or mixtures thereof; and extrudable thermoplastics including polyvinylchloride, polypropolene, polyester, polyethelene and polyurethane or the like. In the case of rubber, it may be cured or set at temperatures upward of 180°F. The thermoplastic polymeric materials reach a thermoplastic state at temperatures above 180°F. The rubber tube 12 is optionally but preferably formed over a flexible mandrel 14 which is shown in dotted form. The mandrel is preferred when a rubber tube material is used because the mandrel insures dimensional stability of the tube inside diameter.

A heat shrinkable yarn 16, such as nylon or polyester, is then twined over the tube to form a reinforcement 18. In the process of the invention, it is not necessary to pre-shrink the yarn. The twining may take the form of spiraling, braiding or the like. The yarn 16 is applied to cover as much of the tube as possible. The reinforcement 18 covers from essentially 85 to near 100 percent of the tube. The tube 12 is covered with as much reinforcement 18 as possible, but complete coverage cannot be achieved in the twining process because interstitial spaces 20 occur between individual yarn strands. The amount of tube coverage which may be achieved is affected by many factors. These factors include; tube diameter, yarn denier, number of yarn strands used in the twining process, the amount of twist per length of yarn, and the type of yarn being used.

A heavy denier and generally untwisted yarn 16 is used. A heavy denier insures a sufficient mass of yarn to cover the tube. For example, it has been determined that 24 yarn strands of 13,200 denier will sufficiently cover a one-half inch inside diameter tube of nominal thickness. As the tube diameter increases, heavy denier yarns and more yarn strands may be used. Yarns having a twist of no more than one twist per inch have been used but a zero twist yarn is preferred. The zero twist yarn 16 lies essentially flat on the tube 12 when twined and gives good coverage whereas a highly twisted yarn would lie in an oval shape on the tube leaving large interstitial spaces between yarn strands. Large interstitial spaces result in poor tube coverage. The generally untwisted yarn is required as a part of the invention for a reason which will be later explained.

The type and condition of yarn 16 used plays an important part in the twining process. Some yarns may characteristically form a natural adhesive bond with the polymeric tube while others must be chemically treated to achieve a satisfactory adhesive bond with the tube. For example, nylon yarn will form a natural bond with a rubber tube when the rubber tube is vulcanized or cured, whereas polyester yarn will not. For this reason, it has been standard practice to treat yarns, such as polyester in this example, for adhesion prior to the step of twining the yarn into a reinforcement. Unfortunately, when polyester yarn is treated for adhesion to rubber, the twining qualities of the yarn are impaired. The adhesive treatment increases the friction of the yarn and prevents it from being twined and pulled into a tight pack such as by braiding. However, polyester yarn is preferred over other yarns such as nylon, because polyester has a high strength to weight ratio. Also, untreated or "greige" polyester yarn has very good braiding qualities because of its low friction or "slipperiness".

Here, it should be noted with particularity that a specific part of this invention is directed toward establishing a method of using those yarns whose twining or braiding characteristics are impaired when they are pre-treated for adhesion or otherwise. As mentioned previously, a generally untwisted yarn is used. When an untwisted yarn is tensioned, the fibers of the yarn become parallel leaving minute interstitial spaces between adjacent fibers; no forces normal to the fibers are generated to pull the fibers in close pressure contact with each other. However, when twisted yarn is tensioned, the fibers of the yarn move to become parallel but they are restricted from becoming parallel because the fibers form helices throughout the length of the yarn strand; forces normal to the fibers are generated during tensioning which pull the fibers into close pressure contact with each other. When a liquid adhesive or cement is applied to an untwisted strand of yarns under tension, the cement is able to penetrate the yarn strand through the intersticial spaces between adjacent strand fibers. The adhesive is aided in penetrating the yarn strand by capillary action forces. Contrarily, when a liquid adhesive is applied to a tensioned but twisted yarn strand, the cement is unable to penetrate into the strand because the fibers of the strand are held into pressure contact with each other. Consequently, and in accordance with the invention, generally untwisted and untreated textile yarns are twined over a polymeric tube to form a reinforcement and then the reinforcement may be treated for proper adhesion by applying an adhesive or cement to the yarn such as by dipping or immersing. Optionally, an adhesive may be applied both before and after the step of twining. When desired, the step of applying an adhesive may be eliminated altogether. After the reinforcement 18 has been twined into position and treated for adhesion as desired, a cover 22 of a polymeric material is formed over the reinforcement 18 to define an unset or "green" hose. The cover 22 may be the same polymeric material as, or different from, the polymeric material of the tube 12. With the cover in place, the hose is ready for heat setting.

As is known in the art, it is desirable to have the reinforcing yarn strands located as near as possible to the "locked angle" in a finished hose. The locked angle is a helical angle of approximately 54°, 44 min. A generally unshrinkable textile yarn, for example, a yarn that shrinks less than three percent when heated, may be twined over the tube of the hose at the locked angle. Such a hose may then be cured or heat set without appreciably changing the reinforcement angle and without introducing dimensional irregularity into the hose. For this reason, low shrinking or pre-shrunk yarns are typically used in the prior art.

Figure 2:
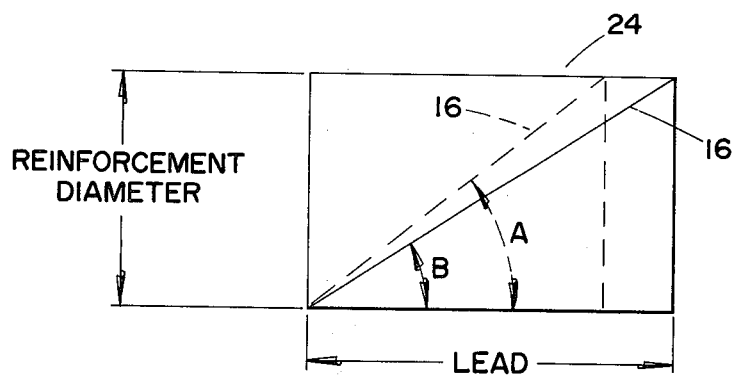
FIG. 2 is a plan view of a length of hose of the invention that has been cut and flattened to show helical angle relationships of a reinforcing textile strand of the hose.

In accordance with the invention, heat shrinkable textile yarns are used. The yarn is twined with a high coverage reinforcement as previously explained. Referring to FIG. 2, a length of hose 24 which has been longitudinally cut and flattened is schematically shown. The length of the hose corresponds to one revolution of yarn 16 of the reinforcement as twined around the tube. Such a length is known as the reinforcement "lead". The heat shrinkable yarn 16 is twined at a helical angle B which is somewhat less than the desired locked angle. The helical angle B varies as a function of hose diameter and the amount of yarn shrinkage. In accordance with the invention, it has been found that the yarn strands 16 of the reinforcement may be advantageously heat shrunk to a larger helical angle A. The shrinking compacts the reinforcement into a tighter package which further concentrates the reinforcement coverage nearer to 100 percent. Accordingly, a tube may be twined with reinforcement at a helical angle B and the reinforcement may be heat shrunk to the desired locked angle A. The change in helical angle may be experimentally determined by building several pieces of hose with reinforcements at different helical angles and noting the amount of angle change when the reinforcement is shrunk with heat. For example, it has been determined that polyester yarn, which shrinks up to approximately 11 percent at temperatures above 180°F, may be applied at the following helical angles to be heat shrunk to near the locked angle of 54°:

| Hose Inside Diameter, Inches | Helical Angle, Degrees |
|---|---|
| ¼ | 53 |
| ½ | 53 |
| ¾ | 53 |

During the textile heat shrinking process, large forces are generated on the hose tube. The forces are so large that the tube may be pulled to a smaller diameter. A mandrel may be used to keep the tube from changing internal dimensions. If a mandrel is not used, compensation must be made to account for change in diameter. When the diameter of the tube decreases, there is a resulting change in the lead. Thus, the helical angle may become smaller as the tube diameter decreases. The textile shrinking forces are so high that large amounts of polymeric tube material would be displaced past adjacent strands if it were not for the yarn strands being twined into a high coverage reinforcement. Here also, the importance of using a generally non-twisted yarn should be stressed. A non-twisted yarn remains essentially flat on the hose during the shrinking process. But if a twisted yarn were used, the individual yarn strands would be drawn into an oval cross section leaving large interstitial spaces between adjacent yarn strands thereby reducing the amount of reinforcement coverage.

Figure 3:
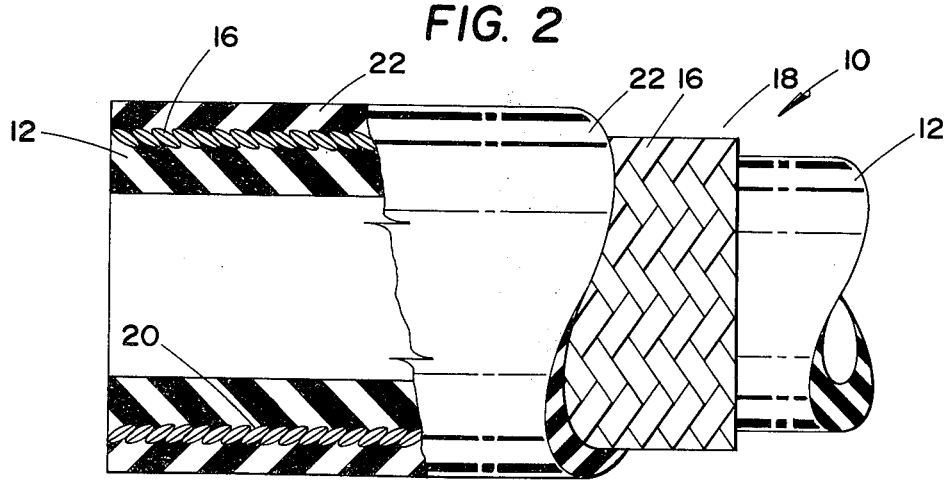
FIG. 3 is a view similar to FIG. 1 but showing a finished hose of the invention.

Referring now to FIG. 3, a completed hose 10 is shown. During the heat setting process, the reinforcement 16 is compacted and polymeric material is displaced into the interstitial spaces 20 adjacent each yarn strand, further increasing the reinforcement coverage. When the polymerical material moves into the interstitial spaces 20 between individual yarn strands, a mechanical bond between the reinforcement 18 and the polymeric material of the hose is formed. In some case, the mechanical bond is sufficient, making it necessary to chemically treat the yarn for adhesion as previously described. The heat setting process may take various forms. If a thermoplastic material is used, the green hose of FIG. 1 may be passed through a heat tunnel to heat the polymeric material to the heat setting temperature of plastic state while simultaneously heating the textile reinforcement to the shrinking temperature. Where a material such as rubber is used, the hose may be open steam cured or sheathed with lead and heated to set or cure the rubber at a temperature at least equal to the shrinkage temperature of the textile reinforcement.

Perhaps the most outstanding or significant combination of the invention is the combination which includes a heat curable rubber hose having a single ply reinforcement of polyester yarn. Such a hose built in accordance with the method of the invention has displayed strength properties which are better than prior art hoses having multiple plies of reinforcement. This is because the prior art methods were insufficient for packing a reinforcement generally greater than 85 but approaching 100 percent, in a single reinforcement ply. To illustrate, two hoses of the same internal and external dimensions were constructed. One hose was built using prior art methods and the second hose was built in accordance with the method of the invention. Both hoses were of the same rubber material and both were reinforced with polyester yarn. The following table illustrates the comparative results.

| Fabrication Method | No. of Braid Plies | Yarn Wt. per 100 ft. | Hose Wt. per 100 ft. | Min. Burst psi |
| --- | --- | --- | --- | --- |
| Prior Art | 2 | 5.52 | 32.72 | 5,000 |
| This Invention | 1 | 4.09 | 23.17 | 6,000 |

Thus, it is seen that the hose of the invention has less reinforcement and is lighter in weight while maintaining superior minimum burst characteristics.

The foregoing detailed description is made for purpose of illustration only and is not intended to limit the scope of the invention which is to be determined from the appended claims.

What is claimed is:
1. A flexible hose comprising:
an initially heat curable rubber tube;
one braided ply of essentially zero twist heat shrinkable, initially greige polyester yarn strands comprised of fibers disposed over and substantially covering said tube to define an essentially flat reinforcement;
a cement interstitially disposed between the tube and reinforcement, strands of the braid, and fibers comprising the yarn, the cement and yarn together defining a chemically treated yarn; and
a cover disposed over the reinforcement, the tube, yarn, cement and cover heated to define the cured flexible hose;
whereby application of heat cures the rubber tube and shrinks and further compact the chemically treated yarn to cover near 100 percent of and mechanically interlock with the cured rubber tube.

* * * * *